United States Patent
Ihara et al.

(10) Patent No.: US 8,421,850 B2
(45) Date of Patent: Apr. 16, 2013

(54) IMAGE PROCESSING APPARATUS, IMAGE PROCESSING METHOD AND IMAGE DISPLAY APPARATUS

(75) Inventors: Toshinori Ihara, Tokyo (JP); Mitsuyasu Asano, Tokyo (JP)

(73) Assignee: Sony Corporation (JP)

( * ) Notice: Subject to any disclaimer, the term of this patent is extended or adjusted under 35 U.S.C. 154(b) by 383 days.

(21) Appl. No.: 12/800,187

(22) Filed: May 11, 2010

(65) Prior Publication Data

US 2010/0309294 A1 Dec. 9, 2010

(30) Foreign Application Priority Data

Jun. 3, 2009 (JP) ................................. P2009-134123

(51) Int. Cl.
*H04N 15/00* (2006.01)
*G06T 15/00* (2011.01)

(52) U.S. Cl.
USPC ............................................ 348/51; 345/419

(58) Field of Classification Search ............. 348/42–51; 375/240.01–240.26; 382/285, 294, 278, 382/254, 236, 284, 219, 103, 452; 345/419
See application file for complete search history.

(56) References Cited

U.S. PATENT DOCUMENTS

| | | | | | |
|---|---|---|---|---|---|
| 5,739,844 | A | * | 4/1998 | Kuwano et al. | 348/43 |
| 5,777,666 | A | * | 7/1998 | Tanase et al. | 348/43 |
| 6,314,211 | B1 | * | 11/2001 | Kim et al. | 382/285 |
| 2010/0039428 | A1 | * | 2/2010 | Kim et al. | 345/419 |

FOREIGN PATENT DOCUMENTS

| | | |
|---|---|---|
| JP | 05110933 A | 4/1993 |
| JP | 08331599 A | 12/1996 |
| JP | 10-257525 A | 9/1998 |
| JP | 11355808 A | 12/1999 |
| JP | 2006-332985 A | 12/2006 |
| JP | 2009516864 A | 4/2009 |
| WO | 2010021450 A1 | 2/2010 |

OTHER PUBLICATIONS

Office Action from Japanese Application No. 2009-134123, dated Oct. 24, 2012.

* cited by examiner

*Primary Examiner* — Behrooz Senfi
(74) *Attorney, Agent, or Firm* — Lerner, David, Littenberg, Krumholz & Mentlik, LLP (57) ABSTRACT

Disclosed herein is an image processing apparatus including, a motion-vector detection section configured to find a motion vector corresponding to an image disparity existing between left and right eyes to appear as a disparity in images, and a format determination section configured to determine whether the input image signal is a signal of the 3-dimensional image format or a signal of the 2-dimensional image format.

9 Claims, 9 Drawing Sheets

OBSERVATION-SUBJECT VIRTUAL IMAGE
ON THE FRONT SIDE OF THE IMAGE PLANE
(NEGATIVE-DIRECTION MOTION VECTOR
BETWEEN L AND R)

FIG. 5B

OBSERVATION-SUBJECT VIRTUAL IMAGE
ON THE REAR SIDE OF THE IMAGE PLANE
(POSITIVE-DIRECTION MOTION VECTOR
BETWEEN L AND R)

IMAGE PROCESSING APPARATUS, IMAGE PROCESSING METHOD AND IMAGE DISPLAY APPARATUS

CROSS-REFERENCE TO RELATED APPLICATION

The present application claims priority from Japanese Patent Application No. JP 2009-134123 filed in the Japanese Patent Office on Jun. 3, 2009, the entire content of which is incorporated herein by reference.

BACKGROUND OF THE INVENTION

1. Field of the Invention

The present invention relates to an image processing apparatus capable of recognizing the image format of an input image signal, an image processing method adopted by the image processing apparatus and an image display apparatus employing the image processing apparatus.

2. Description of the Related Art

Since a time in the past, there has been known a 3-dimensional image display apparatus adopting a spectacle system. The 3-dimensional image display apparatus implements binocular visions by showing separate images with disparities to both the eyes of an observer who is wearing a special stereooptican based on optical polarization and/or crystal shutters.

In addition, there has also been known a naked-eye 3-dimensional image display apparatus adopting a parallax barrier system or a lenticular system. This naked-eye 3-dimensional image display apparatus is capable of implementing binocular visions for naked eyes. The naked-eye 3-dimensional image display apparatus adopting these systems do not require the observer to wear a special stereopticon.

In order to implement binocular visions, it is necessary to show different images with disparities to the right and left eyes of the observer. Thus, it is necessary to show at least 2 separate disparity images which are an image for the right eye and an image for the left eye.

In recent years, consumer TVs (televisions) capable of displaying 3-dimensional images have been actually introduced and have been drawing attention.

SUMMARY OF THE INVENTION

A variety of 3-dimensional image formats for supplying a 3-dimensional image signal to an image processing apparatus or an image display apparatus have been proposed. As a specific 3-dimensional image format, there has been provided a format in accordance with which an image for the left eye and an image for the right eye are provided alternately and sequentially along the time axis by adoption of typically the field sequential system. For the consumer TV and the like, it becomes necessary to keep up with the 3-dimensional image format in addition to the known 2-dimensional image format.

Japanese Patent Laid-open Nos. 2006-332985 and Hei 10-257525 disclose an automatic format recognition technology for a variety of 3-dimensional image formats in addition to the known 2-dimensional image format. Above mentioned documents propose a process of determining whether or not an input image is an image of a 3-dimensional image format on the basis of concept as follows. The image for the left eye and the image for the right eye are basically similar to each other, yet a difference corresponding to a disparity in images between the left and right eyes still exists, thus the image for the left eye and the image for the right eye are not identical with each other completely.

According to a technology disclosed in Japanese Patent Laid-open No. 2006-332985, for example, in a process of determining whether or not an input image is an image of a 3-dimensional image format according to the field sequential system, first of all, the input image serving as a subject of a format determination process is divided into 2 sub-images. If the 2 sub-images are determined to be dissimilar to each other, the input image is determined to be a 3-dimensional image. Even in the case of a known 2-dimensional image, however, in images of a scene including a motion, a difference naturally exists between the images. Thus, the technology raises a problem that a 2-dimensional image with vigorous motions can be incorrectly determined to be a 3-dimensional image. In addition, the technology also raises another problem that, even if the input image is correctly determined to be a 3-dimensional image according to the field sequential system by chance, an image display apparatus based on the technology is not capable of correctly displaying the image unless the apparatus is capable of determining which one of the 2 sub-images is an image for the right eye and which one of the 2 sub-images is an image for the left eye.

In order to solve the problems described above, the present invention provides an image processing apparatus, an image processing method and an image display apparatus, which is capable of determining whether an input signal received in accordance with the field sequential system is a signal of the 3-dimensional image format or the 2-dimensional image format with a high degree of precision.

According to an embodiment of the present invention there is provided an image processing apparatus employs:

a motion-vector detection section configured to find a motion vector corresponding to an image disparity existing between left and right eyes to appear as a disparity in images for a case in which an input image signal supplied to the image processing apparatus in accordance with the field sequential system is regarded as a signal of the 3-dimensional image format on the basis of first, second and third images appearing consecutively along the time axis in the input image signal; and a format determination section configured to determine whether the input image signal is a signal of the 3-dimensional image format or a signal of the 2-dimensional image format on the basis of the motion vector corresponding to a disparity in images between left and right eyes and determine whether the currently received image represented by the input image signal is an image for the left eye or an image for the right eye if the input image signal is determined to be a signal of the 3-dimensional image format.

According to another embodiment of the present invention there is provided an image processing method to be adopted by an image processing apparatus includes the steps of:

driving the motion-vector detection section to find a motion vector corresponding to an image disparity existing between left and right eyes to appear as a disparity in images for a case in which an input image signal supplied to the image processing apparatus in accordance with the field sequential system is regarded as a signal of the 3-dimensional image format on the basis of first, second and third images appearing consecutively along the time axis in the input image signal;

driving the format determination section to determine whether the input image signal is a signal of the 3-dimensional image format or a signal of the 2-dimensional image format on the basis of the motion vector corresponding to a disparity in images between left and right eyes; and driving the format determination section to determine whether the currently received image represented by the input image signal is an image for the left eye or an image for the right eye if the input image signal is determined to be a signal of the 3-dimensional image format.

According to yet another embodiment of the present invention there is provided an image display apparatus employs:

a motion-vector detection section configured to find a motion vector corresponding to an image disparity existing between left and right eyes to appear as a disparity in images for a case in which an input image signal supplied to the image display apparatus in accordance with the field sequential system is regarded as a signal of the 3-dimensional image format on the basis of first, second and third images appearing consecutively along the time axis in the input image signal;

a format determination section configured to determine whether the input image signal is a signal of the 3-dimensional image format or a signal of the 2-dimensional image format on the basis of the motion vector corresponding to a disparity in images between left and right eyes and determine whether the currently received image represented by the input image signal is an image for the left eye or an image for the right eye if the input image signal is determined to be a signal of the 3-dimensional image format; and a display section configured to display an image based on the input image signal in accordance with an image format recognized by the format determination section in determining whether the input image signal is a signal of the 3-dimensional image format or the 2-dimensional image format.

In the image processing apparatus, the image processing method and the image display apparatus which are provided by the present invention as described above:

the motion-vector detection section is driven to find a motion vector corresponding to an image disparity existing between left and right eyes to appear as a disparity in images for a case in which an input image signal supplied to the image processing apparatus in accordance with the field sequential system is regarded as a signal of the 3-dimensional image format on the basis of first, second and third images appearing consecutively along the time axis in the input image signal;

the format determination section is driven to determine whether the input image signal is a signal of the 3-dimensional image format or a signal of the 2-dimensional image format on the basis of at least the motion vector corresponding to a disparity in images between left and right eyes; and the format determination section is driven to determine whether the currently received image represented by the input image signal is an image for the left eye or an image for the right eye if the input image signal is determined to be a signal of the 3-dimensional image format.

In accordance with the image processing apparatus, the image processing method and the image display apparatus of the embodiments of the present invention, the format determination is carried out on the basis of at least the motion vector corresponding to a disparity in images between left and right eyes. Thus, with a high degree of precision, it is capable of determining whether the input image signal is a signal of the 3-dimensional image format or a signal of the 2-dimensional image format. In particular, if the input image signal is a signal of the 3-dimensional image format, it is capable of determining whether the currently received image represented by the input image signal is an image for the left eye or an image for the right eye.

BRIEF DESCRIPTION OF THE DRAWINGS

These and other innovations as well as features of the present invention will become clear from the following description of preferred embodiments given with reference to the accompanying diagrams, in which.

DETAILED DESCRIPTION OF THE PREFERRED EMBODIMENTS

Preferred embodiments of the present invention are described in detail by referring to diagrams as follows.

First Embodiment

[Configuration of the Image Display Apparatus]

Figure 1:
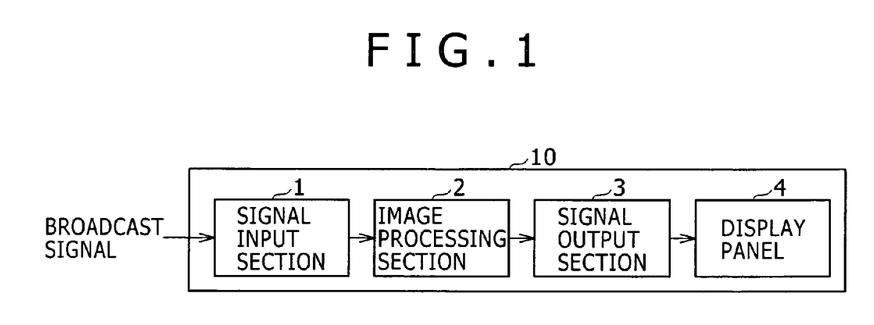
FIG. 1 is a block diagram showing a typical entire configuration of an image display apparatus according to a first embodiment of the present invention.

FIG. 1 is a block diagram showing a typical entire configuration of an image display apparatus 10 according to a first embodiment of the present invention. As shown in the figure, the image display apparatus 10 employs a signal input section 1, an image processing section 2, a signal output section 3 and a display panel 4. The display panel 4 is a typical concrete implementation of a display section provided by the present invention whereas the image processing section 2 is a typical concrete implementation of an image processing apparatus provided by the present invention.

A typical example of the image display apparatus 10 is a TV set. The signal input section 1 typically receives a broadcast signal. Then, the signal input section 1 carries out a process to split the broadcast signal into a luminance signal also referred to as a Y signal and a color-difference signal which is a U signal and a V signal. Finally, the signal input section 1 supplies a result of the process to the image processing section 2 as an input image signal.

The image processing section 2 is a section for carrying out various kinds of signal processing on the input image signal. The image processing section 2 has a function to perform a process to recognize the image format of the input image signal by carrying out the signal processing.

The display panel 4 is a section for 2-dimensionally displaying an image as a plurality of pixels 2-dimensionally laid out on a display screen. The display panel 4 is typically an organic EL (Electro Luminescence) display panel or a liquid-crystal display panel.

The signal output section 3 generates a driving signal on the basis of the input image signal, that is proper for the image format recognized by the image processing section 2, then supplies the driving signal to the display panel 4.

It is to be noted that, as a system for displaying a 3-dimensional image, any one of a variety of known display systems are adoptable. Since the image display apparatus 10 is characterized by the process carried out by the image processing section 2 to recognize the image format of the input image signal, however, the display panel 4 serving as a typical concrete implementation of the display section of the present invention is not explained in particular.

[Configuration of the Image Processing Section 2]

Figure 2:
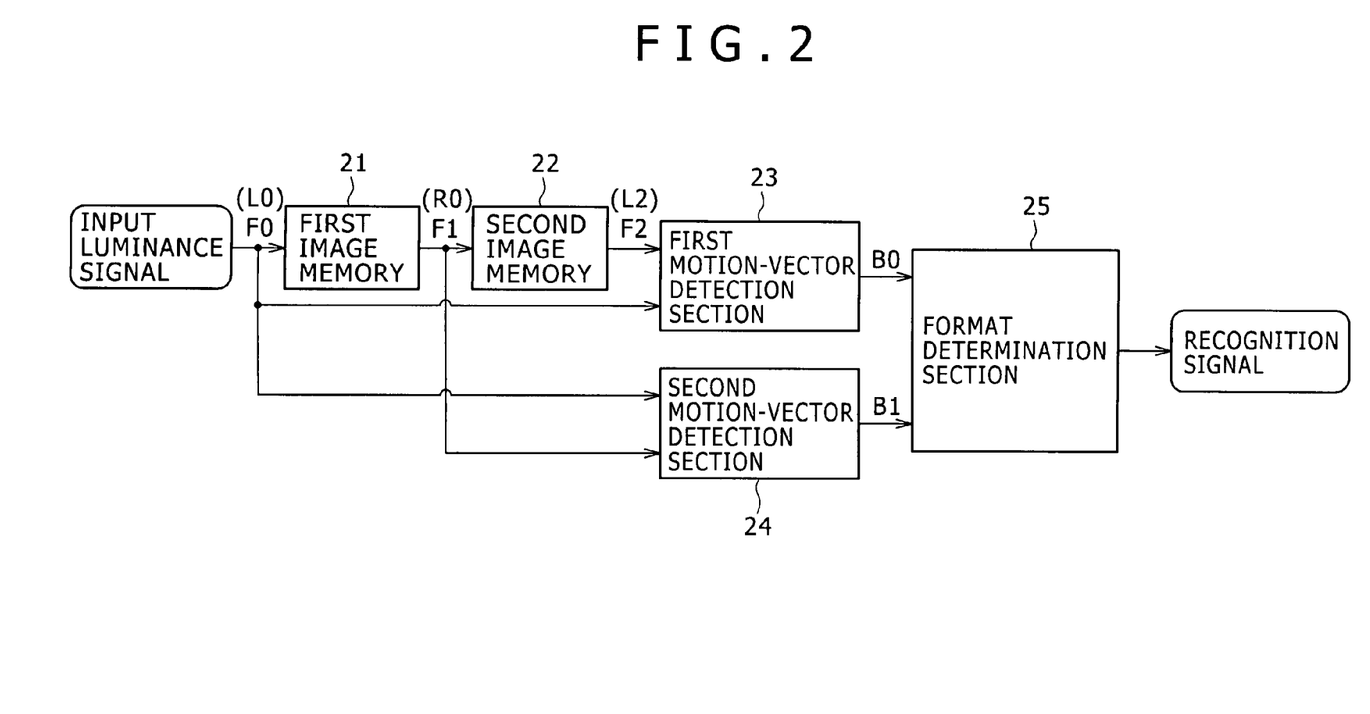
FIG. 2 is a block diagram showing a typical configuration of an image processing section employed in the image display apparatus according to the first embodiment of the present invention.

As described above, the image processing section 2 is a typical concrete implementation of the image processing apparatus provided by the present invention. FIG. 2 is a block diagram showing a typical configuration of the image processing section 2.

As shown in the figure, the image processing section 2 employs a first motion-vector detection section 23, a second motion-vector detection section 24 and a format determination section 25. On the basis of first, second and third images appearing consecutively along the time axis in an input image signal supplied to the image processing apparatus 2 in accordance with the field sequential system, the first motion-vector detection section 23 and the second motion-vector detection section 24 find motion vectors each corresponding to an image disparity existing between left and right eyes to appear as a disparity in images for a case in which the input image signal is a signal of the 3-dimensional image format.

On the other hand, the format determination section 25 is a section for determining whether the input image signal is a signal of the 3-dimensional image format or a signal of the 2-dimensional image format on the basis of the motion vectors each corresponding to a disparity in images between left and right eyes and determining whether the currently received image represented by the input image signal is an image for the left eye or an image for the right eye if the input image signal is determined to be a signal of the 3-dimensional image format.

Figure 3A:
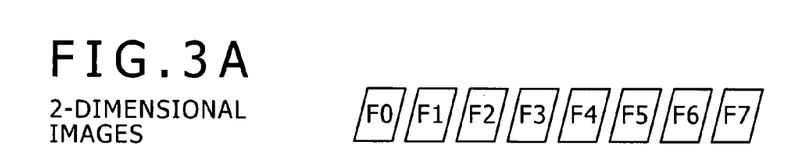
FIG. 3A is an explanatory diagram showing a typical input image signal of the 2-dimensional image format according to the field sequential system.
Figure 3B:
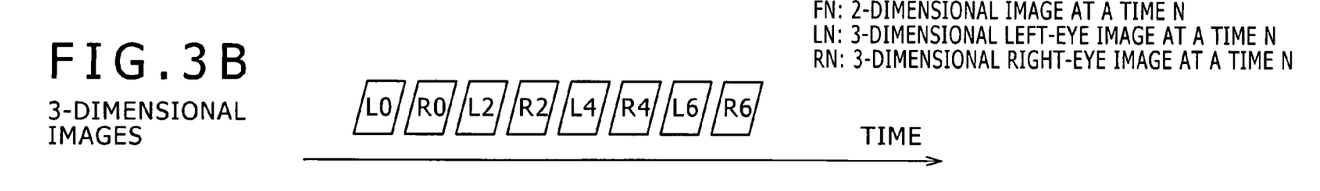
FIG. 3B is an explanatory diagram showing a typical input image signal of the 3-dimensional image format according to the field sequential system.

The image processing section 2 shown in FIG. 2 determines whether the input image signal is a signal having the 3-dimensional image format as shown in FIG. 3B or a signal having the 2-dimensional image format as shown in FIG. 3A. FIG. 3 is a plurality of explanatory diagrams each showing a typical input image signal supplied to the image display apparatus 10 in accordance with the field sequential system. To be more specific, FIG. 3A is an explanatory diagram showing a typical input image signal of the 2-dimensional image format according to the field sequential system. Reference notation FN denotes a 2-dimensional image appearing at a time N. The 2-dimensional image can be a field image or a frame image. On the other hand, FIG. 3B is an explanatory diagram showing a typical input image signal of the 3-dimensional image format according to the field sequential system. Reference notation LN denotes a 3-dimensional image appearing at a time N to serve as a field or frame image for the left eye whereas reference notation RN denotes a 3-dimensional image appearing at a time N to serve as a field or frame image for the right eye. It is to be noted that, as shown in FIG. 3B, a left-eye image LN is supplied to the image display apparatus 10 to be followed by a right-eye image RN sequentially along the time axis. However, the left-eye image LN and the right-eye image RN are eventually shown as images appearing at the same time in order to indicate that the left-eye image LN and the right-eye image RN are virtually synthesized and displayed on the display panel 4 at the same time so that it is possible to implement a binocular vision on the display panel 4.

As shown in FIG. 2, the image processing section 2 functioning as an image-format recognition circuit employs a first image memory 21, a second image memory 22, a first motion-vector detection section 23, a second motion-vector detection section 24 and a format determination section 25.

The first motion-vector detection section 23 and the second motion-vector detection section 24 which are employed in the first embodiment are a typical implementation of a motion-vector detection section provided by the present invention.

Each of the first image memory 21 and the second image memory 22 is used for delaying an input image, which can be a field image or a frame image, by 1 field or 1 frame respectively. In the following description, reference notations F0, F1 and F2 denote first, second and third 2-dimensional images which consecutively appear along the time axis as shown in FIG. 3A. By the same token, reference notations L0, R0 and L2 denote first, second and third 3-dimensional images which consecutively appear along the time axis as shown in FIG. 3B. The first 2-dimensional image F0 or the first left-eye 3-dimensional image L0 is supplied to the first motion-vector detection section 23.

In addition, the third 2-dimensional image F2 or the third left-eye 3-dimensional image L2 is also supplied to the first motion-vector detection section 23. Each of the third 2-dimensional image F2 and the third left-eye 3-dimensional image L2 is an input image delayed by the first image memory 21 and the second image memory 22 from the first 2-dimensional image F0 and the first left-eye 3-dimensional image L0 respectively by 2 fields or 2 frames.

The first 2-dimensional image F0 or the first left-eye 3-dimensional image L0 is also supplied to the second motion-vector detection section 24. In addition, the second 2-dimensional image F1 or the second right-eye 3-dimensional image R0 is also supplied to the second motion-vector detection section 24. Each of the second 2-dimensional image F1 and the second right-eye 3-dimensional image R0 is an input image delayed by the first image memory 21 and the second image memory 22 from the first 2-dimensional image F0 and the first left-eye 3-dimensional image L0 respectively by 1 field or 1 frame. That is to say, the first and second 2-dimensional images F0 and F1 consecutively appearing along the time axis as shown in FIG. 3A or the first and second 3-dimensional images L0 and R0 consecutively appearing along the time axis as shown in FIG. 3B are successively supplied to the second motion-vector detection section 24.

Each of the first motion-vector detection section 23 and the second motion-vector detection section 24 is a section which is used for computing a motion vector and outputting the computed motion vector to the format determination section 25. The motion vector is a vector which represents the quantity of a motion from a specific input image to an input image immediately lagging behind the specific input image in horizontal and vertical directions. The quantity of a motion is expressed in pixel units. There are a variety of techniques for detecting a motion vector. A typical example of the techniques for detecting a motion vector is a block matching technique. In the first embodiment, however, no specific concrete technique for detecting a motion vector is specified in particular. That is to say, the first embodiment by no means limits the technique for detecting a motion vector to a specific concrete one. In other words, any technique for detecting a motion vector can be adopted as long as the technique can be used to produce a motion vector obtained as a result of detection for a block of pixels.

To put it more concretely, the first motion-vector detection section 23 detects a first motion vector B0 between the first 2-dimensional image F0 or the first left-eye 3-dimensional image L0 and the third 2-dimensional image F2 or the third left-eye 3-dimensional image L2 and outputs the first motion vector B0 to the format determination section 25. On the other hand, the second motion-vector detection section 24 detects a second motion vector B1 between the first 2-dimensional image F0 or the first left-eye 3-dimensional image L0 and the second 2-dimensional image F1 or the second right-eye 3-dimensional image R0 and outputs the second motion vector B1 to the format determination section 25. As described above, the first 2-dimensional image F0 and the second 2-dimensional image F1 are 2-dimensional images consecutively appearing along the time axis whereas the first left-eye 3-dimensional image L0 and the second right-eye 3-dimensional image R0 are 3-dimensional images consecutively appearing along the time axis.

The format determination section 25 is a section for generating a format recognition signal indicating the format of the input image on the basis of the first motion vector B0 and the second motion vector B1 which are received from the first motion-vector detection section 23 and the second motion-vector detection section 24 respectively. That is to say, the format determination section 25 determines whether the format of the input image represented by the input image signal is the format of a 3-dimensional image or the format of a 2-dimensional image. Thus, information conveyed by the format recognition signal is information indicating whether the format of the input image represented by the input image signal is the format of a 3-dimensional image or the format of a 2-dimensional image. In the block diagram of FIG. 2, the input image signal is shown as an input luminance signal. In addition, if the format determination section 25 determines that the format of the input image represented by the input image signal is the format of a 3-dimensional image, the format determination section 25 further determines whether the currently supplied input image is a 3-dimensional image for the left or right eye. Information indicating whether the current input image is a 3-dimensional image for the left or right eye is also conveyed by the format recognition signal.

[Processing Performed by the Image Processing Section 2 to Recognize an Image Format]

The most distinguished characteristic of the image display apparatus according to the first embodiment is processing carried out by the image processing section 2 to recognize the format of input images. Thus, the following description concretely explains the processing carried out by the image processing section 2 to recognize the format of input images as characteristic processing of the image display apparatus 10. In particular, the following description concretely explains processing carried out by the format determination section 25 to recognize the format of input images on the basis of a first motion vector B0 and a second motion vector B1 which are received from the first motion-vector detection section 23 and the second motion-vector detection section 24 respectively.

In the image processing section 2 shown in FIG. 2, the first motion-vector detection section 23 detects a first motion vector B0 between the first 2-dimensional image F0 or the first left-eye 3-dimensional image L0 and the third 2-dimensional image F2 or the third left-eye 3-dimensional image L2 and outputs the first motion vector B0 to the format determination section 25. On the other hand, the second motion-vector detection section 24 detects a second motion vector B1 between the first 2-dimensional image F0 or the first left-eye 3-dimensional image L0 and the second 2-dimensional image F1 or the second right-eye 3-dimensional image R0 and outputs the second motion vector B1 to the format determination section 25. As described above, the first 2-dimensional image F0 and the second 2-dimensional image F1 are 2-dimensional images consecutively appearing along the time axis whereas the first left-eye 3-dimensional image L0 and the second right-eye 3-dimensional image R0 are 3-dimensional images consecutively appearing along the time axis.

If the format of the input image signal supplied to the image processing section 2 is the 3-dimensional-image format like the one shown in FIG. 3B, the quantity of a motion between frames of a 3-dimensional image can be obtained from the first motion vector B0. In this case, the second motion vector B1 is a motion vector which represents a disparity in images between the left and right eyes. Thus, the magnitude of the disparity in images between left and right eyes can be obtained from the second motion vector B1.

If the format of the input image signal supplied to the image processing section 2 is the 2-dimensional-image format like the one shown in FIG. 3A, on the other hand, the direction (and the absolute value) of each of the first motion vector B0 and the second motion vector B1 change differently from those for the format of a 3-dimensional image.

The format determination section 25 determines whether the format of the input image represented by the input image signal is the format of a 3-dimensional image or the format of a 2-dimensional image on the basis of the properties of the first motion vector B0 and the second motion vector B1. In addition, if the format determination section 25 determines that the format of the input image represented by the input image signal is the format of a 3-dimensional image, the format determination section 25 further determines whether the currently supplied input image is a 3-dimensional image for the left eye or a 3-dimensional image for the right eye.

Figure 6:
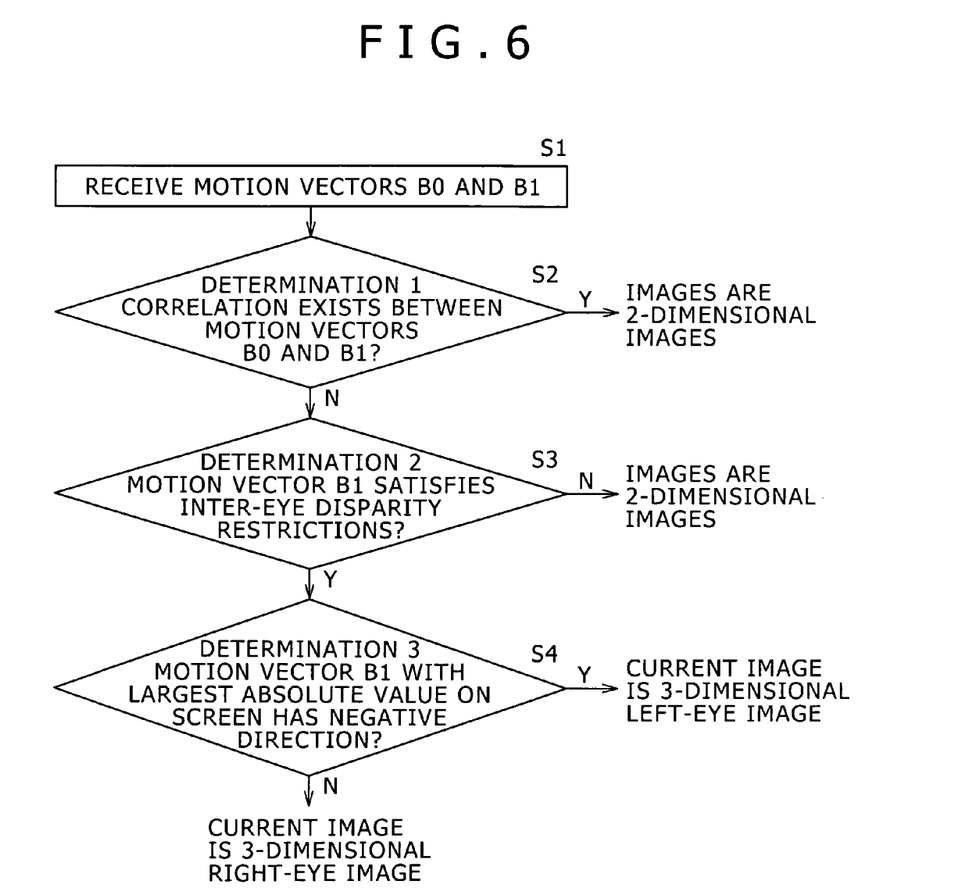
FIG. 6 shows a flowchart representing image-format determination processing which is carried out by a format determination section employed in the image processing section shown in FIG. 2.

FIG. 6 shows a flowchart representing image-format determination processing which is carried out by the format determination section 25 as described above. As shown in the figure, the flowchart begins with a step S1 at which the format determination section 25 receives a first motion vector B0 and a second motion vector B1. Then, at the next step S2, the format determination section 25 carries out a first determination process to determine whether or not a correlation exists between the first motion vector B0 and the second motion vector B1. If the result of the first determination process carried out at the step S2 is Y (Yes) indicating that a correlation exists between the first motion vector B0 and the second motion vector B1, the format determination section 25 determines that the format of the input image represented by the input image signal is the format of a 2-dimensional image. This is because, in the case of the format of a 3-dimensional image, a correlation hardly exists between the first motion vector B0 representing the quantity of a motion between frames and the second motion vector B1 representing the magnitude of a disparity in images between the left and right eyes even though a close correlation in the direction of the time axis exists between the quantities of inter-frame motions.

If the result of the first determination process carried out at the step S2 is N (No) indicating that no correlation exists between the first motion vector B0 and the second motion vector B1, on the other hand, the flow of the processing goes on to a step S3 at which the format determination section 25 further carries out a second determination process to determine whether or not the second motion vector B1 satisfies restrictions of the disparity in images between the left and right eyes. To be more specific, as will be described later in detail, the format determination section 25 determines whether or not the magnitude of the disparity in images between the left and right eyes is not greater than threshold values TH0' and TH1' determined in advance. As explained earlier, the magnitude of the disparity in images between the left and right eyes is a magnitude obtained from the second motion vector B1. The threshold values TH0' and TH1' determined in advance are used as criteria as to whether or not the binocular vision is realized.

If the result of the second determination process carried out at the step S3 is N (No) indicating that the second motion vector B1 does not satisfy the restrictions of the disparity in images between the left and right eyes or, to put it more concretely, the magnitude of the disparity in images between the left and right eyes is greater than the threshold values TH0' and TH1' determined in advance, the format determination section 25 determines that the format of the input image represented by the input image signal is the format of a 2-dimensional image.

If the result of the second determination process carried out at the step S3 is Y (Yes) indicating that the second motion vector B1 satisfies the restrictions of the disparity in images between the left and right eyes or, to put it more concretely, the magnitude of the disparity in images between the left and right eyes is not greater than the threshold values TH0' and TH1' determined in advance, on the other hand, the format determination section 25 determines that the format of the input image represented by the input image signal is the format of a 3-dimensional image.

In this case, the flow of the processing goes on to a step S4 at which the format determination section 25 further carries out a third determination process to determine whether the currently supplied input image is a 3-dimensional image for the left eye or a 3-dimensional image for the right eye. In the third determination process, the format determination section 25 recognizes the direction of the second motion vector B1. Specifically, the format determination section 25 determines whether or not the direction of the second motion vector B1 having the largest absolute value among the first motion vectors B1 in the surface of the image serving as a subject of the vector/format detection processing is the negative direction. If the result of the third determination process carried out at the step S4 is Y (Yes) indicating that the direction of the second motion vector B1 is the negative direction, the format determination section 25 determines that the currently supplied input image is a 3-dimensional image for the left eye. If the result of the third determination process carried out at the step S4 is N (No) indicating that the direction of the second motion vector B1 is not the negative direction, on the other hand, the format determination section 25 determines that the currently supplied input image is a 3-dimensional image for the right eye. It is to be noted that the third determination process carried out to recognize the direction of the second motion vector B1 will be explained later in detail by referring to diagrams of FIGS. 5A and 5B.

[Conditions in which the Binocular Vision is Realized]

Figure 4A:
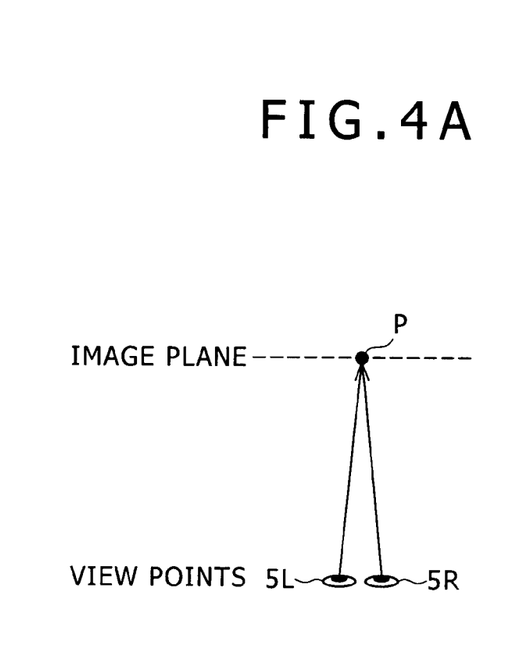
FIGS. 4A to 4D are explanatory diagrams showing relations between display positions of images and realization of the binocular vision.
Figure 4B:
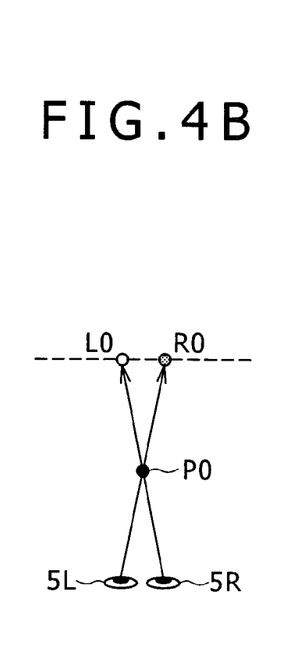
Figure 4C:
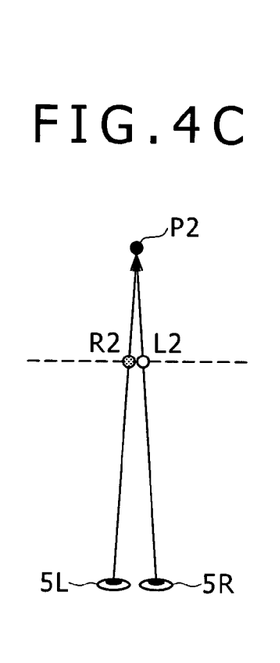
Figure 4D:
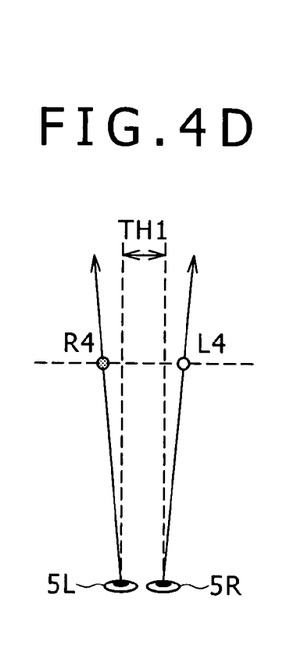

FIGS. 4A to 4D are explanatory diagrams showing relations between the display position of an image and realization of the binocular vision. To be more specific, FIG. 4A is an explanatory diagram showing a state in which the left and right eyes 5L and 5R of an observer see the same image pixel positions on an image plane also referred to as an image display plane. In this case, there is no disparity on the displayed image so that the observer is seeing a real image P. On the other hand, each of FIGS. 4B to 4D is a diagram showing a state of displaying two images with a disparity in images between the left and right eyes.

To be more specific, FIG. 4B is an explanatory diagram showing a state in which a right-eye image R0 is positioned on the image display plane at a position on the right side of a left-eye image L0. Thus, in the case of the state shown in FIG. 4B, the observer is stereoscopically viewing a virtual image P0 on the front side of the image display plane. FIG. 4C is a diagram showing a state in which a right-eye image R2 is positioned on the image display plane at a position on the left side of a left-eye image L2, that is, a diagram showing left-image and right-image positions opposite to the right-image and left-image positions in the state shown in FIG. 4B. Thus, in the case of the state shown in FIG. 4C, the observer is stereoscopically viewing a virtual image P2 on the rear side of the image display plane.

FIG. 4D is a diagram showing a state in which images with a disparity are displayed but the binocular vision is not realized, that is, no virtual image is created. Much like the state shown in FIG. 4C, FIG. 4D is a diagram showing a state in which a right-eye image R4 is positioned on the image display plane at a position on the left side of a left-eye image L4. Since the right-eye image R4 and the left-eye image L4 are separated away from each other by an excessively far distance, however, the binocular vision is not realized. Let reference notation TH1 denote the value of an assumed disparity in images between the left and right eyes 5L and 5R of the observer. In this case, the binocular vision is not realized if the magnitude of the disparity in images between the right-eye image R4 and the left-eye image L4 is greater than the assumed disparity TH1. Thus, in order to implement a binocular vision showing a virtual image positioned on the rear side of the image display plane, it is necessary to reduce the disparity in images between the right-eye image R4 and the left-eye image L4 to a value which is not greater than a predetermined threshold value TH1' set on the basis of the assumed disparity TH1.

Also in order to implement a binocular vision showing a virtual image positioned on the front side of the image display plane as is the case with the state shown in FIG. 4B, there is a condition for the binocular vision. If the right-eye image R0 and the left-eye image L0 are separated away from each other by an excessively far distance even in the state shown in FIG. 4B, the binocular vision is not realized. Specifically, it is necessary to reduce the disparity in images between the right-eye image R0 and the left-eye image L0 to a value not greater than a predetermined threshold value TH0' set on the basis of an assumed viewing distance TH0 which is defined as the distance between the image display plane and the view point of the observer.

It is to be noted that, in one 3-dimensional image, pixels forming a virtual image on the front side of the image display plane are normally mixed with pixels forming a virtual image on the rear side of the image display plane. When the 3-dimensional image is supplied to the image display apparatus 10, the direction of the second motion vector B1 detected from the 3-dimensional image can be used to determine whether pixels are pixels forming a virtual image on the front side of the image display plane or pixels forming a virtual image on the rear side of the image display plane. By referring to diagrams of FIGS. 5A and 5B, the following description explains a process of making use of the direction of the second motion vector B1 detected from the 3-dimensional image to determine whether pixels are pixels forming a virtual image on the front side of the image display plane or pixels forming a virtual image on the rear side of the image display plane.

Figure 5A:
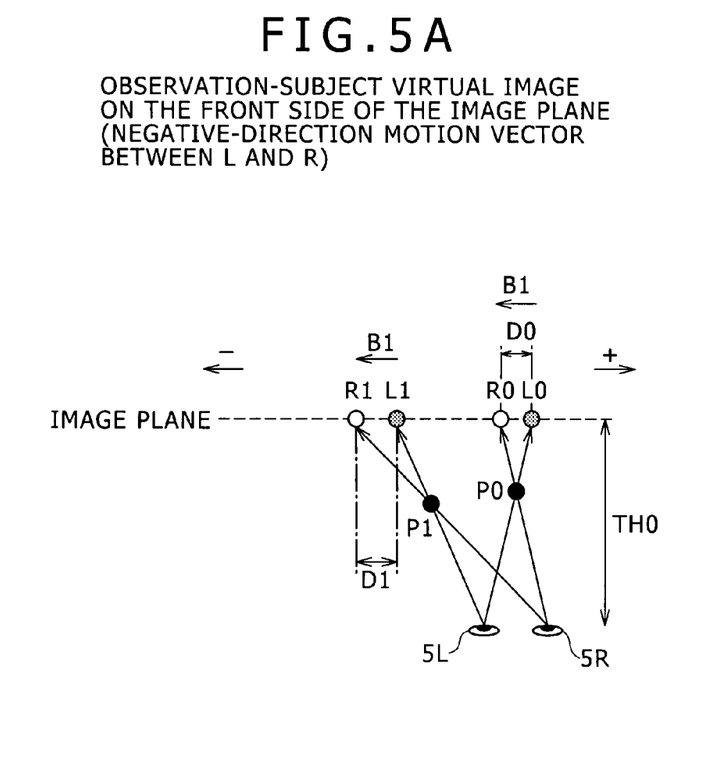
FIGS. 5A and 5B are explanatory diagrams to be referred to in description of a motion vector which represents a disparity in images between left and right eyes.

FIG. 5A is an explanatory diagram showing a state in which virtual images P0 and P1 are formed on the front side of the image display plane. The virtual image P0 is a virtual image formed on the basis of a right-eye image R0 and a left-eye image L0 whereas the virtual image P1 is a virtual image formed on the basis of a right-eye image R1 and a left-eye image L1. In the case of the virtual image P0, the right-eye image R0 is positioned on the image display plane at a position on the left side of a left-eye image L0. By the same token, in the case of the virtual image P1, the right-eye image R1 is positioned on the image display plane at a position on the left side of a left-eye image L1. In these cases, the second motion vector B1 is a vector between the left-eye image L0 and the right-eye image R0 or a vector between the left-eye image L1 and the right-eye image R1. Let the direction to the left be referred to as a negative direction (−) whereas the direction to the right be referred to as a positive direction (+). In this case, the direction of the second motion vector B1 is the negative direction. It is to be noted that, in the state shown in FIG. 5A, an inter-eye disparity D0 between the right-eye image R0 and the left-eye image L0 is not greater than a predetermined threshold value TH0' set on the basis of the assumed viewing distance TH0. By the same token, an inter-eye disparity D1 between the right-eye image R1 and the left-eye image L1 is not greater than the threshold value TH0' determined in advance.

Figure 5B:
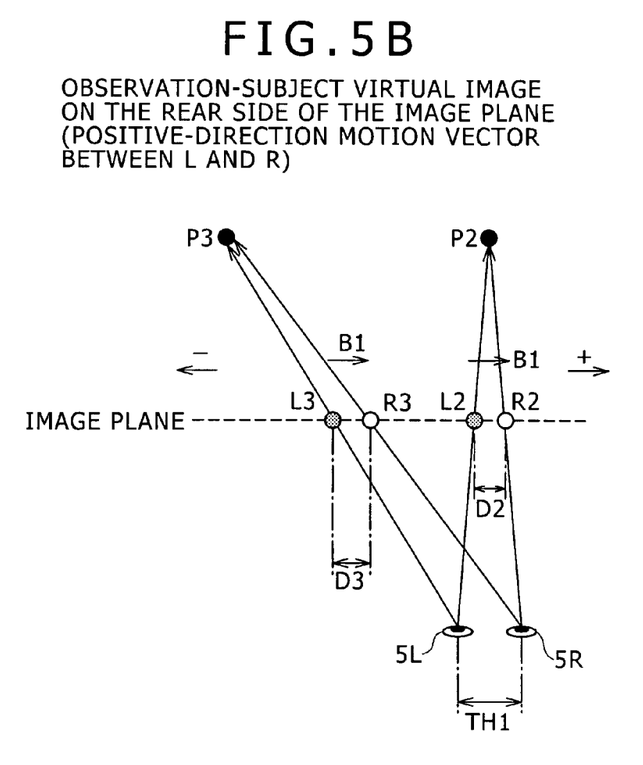

On the other hand, FIG. 5B is an explanatory diagram showing a state in which virtual images P2 and P3 are formed on the rear side of the image display plane. The virtual image P2 is a virtual image formed on the basis of a right-eye image R2 and a left-eye image L2 whereas the virtual image P3 is a virtual image formed on the basis of a right-eye image R3 and a left-eye image L3. In the case of the virtual image P2, the right-eye image R2 is positioned on the image display plane at a position on the right side of a left-eye image L2. By the same token, in the case of the virtual image P3, the right-eye image R3 is positioned on the image display plane at a position on the right side of a left-eye image L3. In these cases, the second motion vector B1 is a vector between the left-eye image L2 and the right-eye image R2 or a vector between the left-eye image L3 and the right-eye image R3. Let the direction to the left be referred to as a negative direction (−) whereas the direction to the right be referred to as a positive direction (+). In this case, the direction of the second motion vector B1 is the positive direction. It is to be noted that, in the state shown in FIG. 5B, an inter-eye disparity D2 between the right-eye image R2 and the left-eye image L2 is not greater than a predetermined threshold value TH1' set on the basis of the assumed disparity TH1. By the same token, an inter-eye disparity D3 between the right-eye image R3 and the left-eye image L3 is not greater than the threshold value TH1' determined in advance.

As explained earlier, in one 3-dimensional image, pixels forming a virtual image on the front side of the image display plane are normally mixed with pixels forming a virtual image on the rear side of the image display plane. Thus, the second motion vector B1 can be oriented in both the positive and negative directions. In a number of cases, however, an ordinary 3-dimensional image is an image which shows a virtual image on the front side. Thus, by having the format determination section 25 determine whether the direction of the second motion vector B1 having the largest absolute value among the first motion vectors B1 in the surface of the image serving as a subject of the vector/format detection processing is the negative or positive direction at the step S4 of the flowchart shown in FIG. 6, it is possible to determine whether the current input 3-dimensional image is an image for the left eye or the right eye. That is to say, if the direction of the second motion vector B1 having the largest absolute value among the first motion vectors B1 in the surface of the image serving as a subject of the vector/format detection processing is the negative direction, the current input 3-dimensional image can be determined to be an image for the left eye.

In addition, as explained before, at the step S3 of the flowchart shown in FIG. 6, the format determination section 25 carries out the second determination process to determine whether or not the second motion vector B1 satisfies restrictions of the disparity in images between the left and right eyes. Typically, the format determination section 25 carries out the second determination process by determining whether or not the condition (1) or (2) described below is satisfied. That is to say, the second motion vector B1 is determined to be a vector satisfying the restrictions of the disparity in images between the left and right eyes if condition (1) or (2) described below is satisfied Condition (1)

The absolute values of all vectors B1 oriented in the positive direction on the screen are not greater than the threshold value TH1' determined in advance and the absolute values of all vectors B1 oriented in the negative direction on the screen are not greater than the threshold value TH0' determined in advance.

Condition (2)

The absolute values of all vectors B1 oriented in the positive direction on the screen are not greater than the threshold value TH0' determined in advance and the absolute values of all vectors B1 oriented in the negative direction on the screen are not greater than the threshold value TH1' determined in advance.

In the case of a screen size of 1,920 pixels×1,080 pixels, to put it more concretely, the predetermined threshold value TH0' is set on the basis of the assumed viewing distance TH0 at 40 pixels.

In the case of a screen size of 1,920 pixels×1,080 pixels, to put it more concretely, the predetermined threshold value TH1' is set on the basis of the assumed disparity TH1 at eight pixels.

Effects of the First Embodiment

In accordance with the first embodiment, the format of an input image can be recognized on the basis of at least a motion vector representing a disparity in images between left and right eyes. Thus, it is capable of determining whether the format of a signal representing the input image is the format of a 3-dimensional image or the format of a 2-dimensional image with a high degree of precision. In particular, if the format of the signal representing the input image is the format of a 3-dimensional image, it is also possible to determine whether the current input image is an image for the left eye or an image for the right eye. Thus, the image display apparatus 10 is capable of displaying an image properly in a correct format.

Second Embodiment

Next, an image display apparatus according to a second embodiment of the present invention is explained. It is to be noted that, in the image display apparatus according to the second embodiment, components virtually identical with their respective counterparts employed in the image display apparatus according to the first embodiment are denoted by the same reference numerals and the same reference notations as the counterparts. In addition, explanations of the identical components are properly omitted in order to avoid duplications of descriptions.

Figure 7:
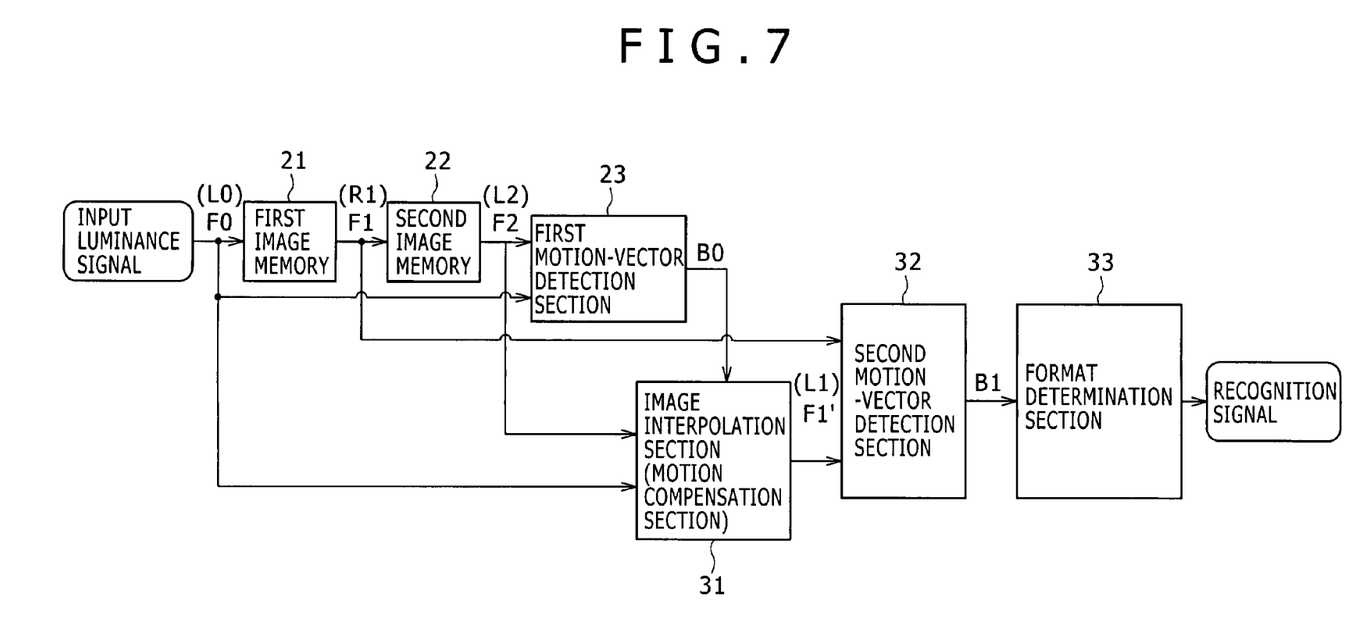
FIG. 7 is a block diagram showing the configuration of an image processing section employed in an image display apparatus according to a second embodiment.

FIG. 7 is a block diagram showing the configuration of an image processing section 2 according to the second embodiment. The configuration of the image processing section 2 shown in FIG. 7 is different from the configuration of the image processing section 2 according to the first embodiment shown in the block diagram of FIG. 2 in that the second embodiment has an image interpolation section 31. In addition, the second embodiment employs a new second motion-vector detection section 32 in place of the second motion-vector detection section 24 included in the first embodiment. On top of that, the second embodiment employs a new format determination section 33 for replacing the format determination section 25.

The first motion-vector detection section 23 and the second motion-vector detection section 32 which are employed in the second embodiment are a typical implementation of the motion-vector detection section provided by the present invention.

Figures 8A, 8B:
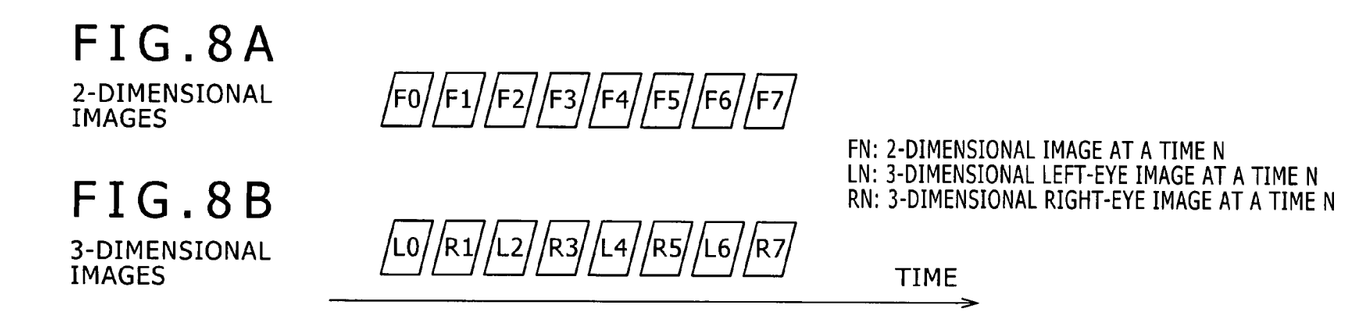
FIG. 8A is an explanatory diagram showing a typical input image signal of the 2-dimensional image format according to the field sequential system.
FIG. 8B is an explanatory diagram showing a typical input image signal of the 3-dimensional image format according to the field sequential system.

The image processing section 2 shown in the block diagram of FIG. 7 is designed to function as a circuit for determining whether the format of an input signal is the format of a 2-dimensional image signal like one shown in FIG. 8A or the format of a 3-dimensional image signal like one shown in FIG. 8B.

FIG. 8A is an explanatory diagram showing a typical input image signal of the 2-dimensional image format according to the field sequential system. Reference notation FN denotes a 2-dimensional image appearing at a time N. The 2-dimensional image can be a field image or a frame image. On the other hand, FIG. 8B is an explanatory diagram showing a typical input image signal of the 3-dimensional image format according to the field sequential system. Reference notation LN denotes a 3-dimensional image appearing at a time N to serve as a field or frame image for the left eye whereas reference notation RN denotes a 3-dimensional image appearing at a time N to serve as a field or frame image for the right eye.

The 3-dimensional images shown in FIG. 8B are different from those shown in FIG. 3B in that left-eye 3-dimensional images LN of the 3-dimensional images shown in FIG. 8B appear at times different from right-eye 3-dimensional images RN of the same 3-dimensional images. If the 3-dimensional images shown in FIG. 8B are processed by the image processing section 2 shown in FIG. 2, disparity quantities are undesirably mixed with motion distances so that the format of the input images is recognized incorrectly.

In order to solve this problem, in the image processing section 2 shown in FIG. 7, the image interpolation section 31 carries out an image interpolation process based on motion compensation to find an image F1' (or L1) to be used as an image serving as the subject of image-format determination processing. The image F1' (or L1) is an image positioned at a time between the time of the first image F0 (or L0) and the time of the third image F2 (or L2).

The second motion-vector detection section 32 detects a second motion vector B1 between two images, i.e., the first image F0 (or L0) and the image F1' (or L1) serving as the subject of image-format determination processing. The second motion vector B1 is used as a motion vector representing the disparity in images between the left and right eyes. The format determination section 33 is a section for recognizing the format of the input signal on the basis of the second motion vector B1 only. If the input image is a 2-dimensional image, the first image F0 and the image F1' serving as the subject of image-format determination processing are all but equivalent to each other. Thus, the image-format determination processing can be carried out in accordance with a flowchart described by referring to FIG. 9 as follows.

Figure 9:
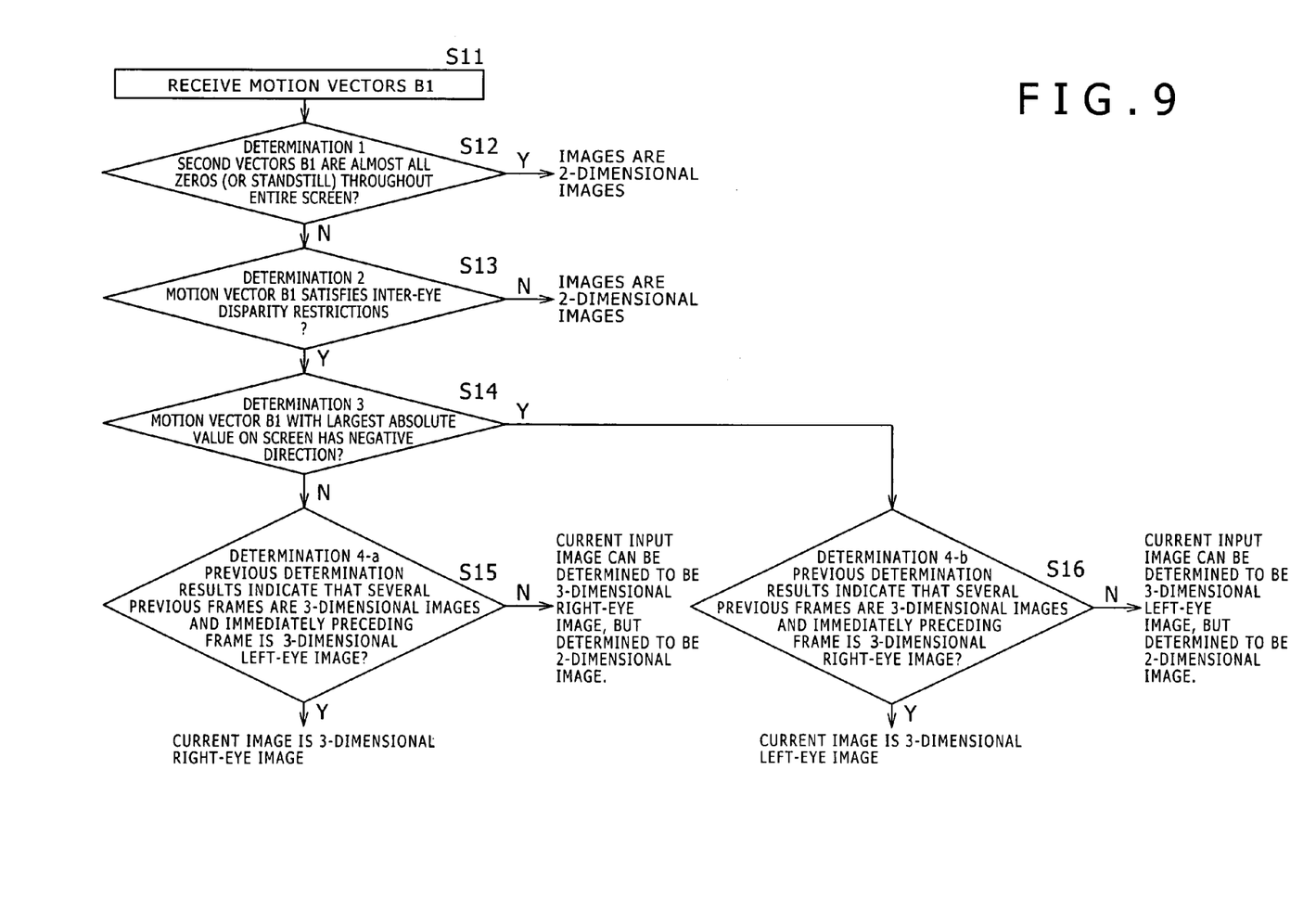
FIG. 9 shows a flowchart representing image-format determination processing which is carried out by a format determination section employed in the image processing section shown in FIG. 7.

FIG. 9 shows a flowchart representing image-format determination processing which is carried out by the format determination section 33 as described above. As shown in the figure, the flowchart begins with a step S11 at which the format determination section 33 receives a second motion vector B1 from the second motion-vector detection section 32. Then, at the next step S12, the format determination section 33 carries out a first determination process to determine whether or not the second vectors B1 are almost all zeros (or standstill) throughout the entire screen. If the magnitude of the second motion vector B1 having the largest absolute value among the first motion vectors B1 on the screen is not greater than a threshold value determined in advance, the second vectors B1 are determined in the first determination process to be almost all standstill throughout the entire screen. If the result of the first determination process carried out at the step S12 is Y (Yes) indicating that the second vectors B1 are determined to be almost all standstill throughout the entire screen, the format of the input images is determined to be the format of 2-dimensional images.

If the result of the first determination process carried out at the step S12 is N (No) indicating that the second vectors B1 are determined to be not all standstill throughout the entire screen, on the other hand, the format of the input images is determined to be the format of 3-dimensional images. In this case, the flow of the processing goes on to a step S13 before continuing to a step S14. Processes carried out at the steps S13 and S14 are essentially identical to those carried out at respectively the steps S3 and S4 of the flowchart shown in FIG. 6. In the case of the flowchart shown in FIG. 9, however, the flow of the processing goes on to a step S15 or S16 after completion of the process carried out at the step S14.

At the step S15, the format determination section 33 carries out a (4-a)th determination process to determine whether or not previous determination results indicate that several previous frames are 3-dimensional images and the immediately preceding frame is a 3-dimensional image for the left eye. If the result of the (4-a)th determination process is N (No) indicating that these conditions are not met, the format determination section 33 may determine that the current input frame is a 3-dimensional image for the right eye. However, the format determination section 33 determines that the current input frame is a 2-dimensional image. If the result of the (4-a)th determination process is Y (Yes) indicating that these conditions are met, on the other hand, the format determination section 33 determines that the current input frame is a 3-dimensional image for the right eye At the step S16, the format determination section 33 carries out a (4-b)th determination process to determine whether or not previous determination results indicate that several previous frames are 3-dimensional images and the immediately preceding frame is a 3-dimensional image for the right eye. If the result of the (4-b)th determination process is N (No) indicating that these conditions are not met, the format determination section 33 may determine that the current input frame is a 3-dimensional image for the left eye. However, the format determination section 33 determines that the current input frame is a 2-dimensional image. If the result of the (4-b)th determination process is Y (Yes) indicating that these conditions are met, on the other hand, the format determination section 33 determines that the current input frame is a 3-dimensional image for the left eye.

Other Embodiments

Implementations of the present invention are by no means limited to the embodiments described so far. Instead, a variety of embodiments can each be used to realize the present invention.

For example, each of the embodiments each implementing image display apparatus 10 is provided for the format of 3-dimensional images which are supplied to the image display apparatus 10 in accordance with the field sequential system. However, each of the embodiments can be applied to the format of a 3-dimensional image of any other kind. For example, each of the first image memory 21 and the second image memory 22 which are employed in the image processing section 2 of each of the block diagrams of FIGS. 2 and 7 can be replaced with a screen left/right division processing circuit or the like in order to apply the image processing according to the present invention to the format of a 3-dimensional image another kind. As described before, each of the first image memory 21 and the second image memory 22 is used for delaying the input signal.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a motion-vector detection section configured to find a motion vector corresponding to an image disparity existing between left and right eyes to appear as a disparity in images for a case in which an input image signal supplied to said image processing apparatus in accordance with a field sequential system is regarded as a signal of a 3-dimensional image format on a basis of first, second and third images appearing consecutively along a time axis in said input image signal; and
a format determination section configured to determine whether said input image signal is a signal of said 3-dimensional image format or a signal of a 2-dimensional image format and determine whether a currently received image represented by said input image signal is an image for the left eye or an image for the right eye if said input image signal is determined to be a signal of said 3-dimensional image format,
wherein said motion-vector detection section detects a first motion vector between said first image and said third image, and detects a second motion vector between any two images selected from said first to third images as two adjacent images appearing consecutively along the time axis, and
wherein said format determination section determines whether or not there is a correlation between said first motion vector and said second motion vector and, based on a result thereof, determines whether the format of said input image signal is said 2-dimensional image format or said 3-dimensional image format.

2. The image processing apparatus according to claim 1 wherein, if said format determination section determines that the format of said input image signal is said 3-dimensional image format, said format determination section further determines whether a current input image is a 3-dimensional image for the left eye or a 3-dimensional image for the right eye.

3. The image processing apparatus according to claim 1 wherein:
said motion-vector detection section comprises a first motion-vector detection sub-section and a second motion-vector detection sub-section;
said first motion-vector detection sub-section detects said first motion vector between said first image and said third image; and
said second motion-vector detection sub-section detects said second motion vector.

4. An image processing apparatus comprising:
a motion-vector detection section configured to find a motion vector corresponding to an image disparity existing between left and right eyes to appear as a disparity in images for a case in which an input image signal supplied to said image processing apparatus in accordance with a field sequential system is regarded as a signal of a 3-dimensional image format on a basis of first, second and third images appearing consecutively along a time axis in said input image signal; and
a format determination section configured to determine whether said input image signal is a signal of said 3-dimensional image format or a signal of a 2-dimensional image format on the basis of said motion vector corresponding to a disparity in images between left and right eyes and determine whether a currently received image represented by said input image signal is an image for the left eye or an image for the right eye if said input image signal is determined to be a signal of said 3-dimensional image format,
wherein:
said format determination section determines whether or not there is a correlation between a first motion vector and a second motion vector;
if said format detection section determines that there is a correlation between said first motion vector and said second motion vector, said format detection section determines that the format of said input image signal is said 2-dimensional image format;
if said format detection section determines that there is no correlation between said first motion vector and said second motion vector, said format determination section further determines whether or not the magnitude of an inter-eye disparity found on the basis of said second motion vector corresponding to said disparity in images between left and right eyes is not greater than a predetermined threshold value used as a criterion as to whether or not a binocular vision is realized;
if said format detection section determines that the magnitude of said inter-eye disparity is not greater than said predetermined threshold value, said motion-vector detection determines that the format of said input image signal is said 3-dimensional image format; and
if said format detection section determines that the magnitude of said inter-eye disparity is greater than said predetermined threshold value, said motion-vector detection determines that the format of said input image signal is said 2-dimensional image format.

5. An image processing apparatus comprising:
a motion-vector detection section configured to find a motion vector corresponding to an image disparity existing between left and right eyes to appear as a disparity in images for a case in which an input image signal supplied to said image processing apparatus in accordance with a field sequential system is regarded as a signal of a 3-dimensional image format on a basis of first, second and third images appearing consecutively along a time axis in said input image signal;

a format determination section configured to determine whether said input image signal is a signal of said 3-dimensional image format or a signal of a 2-dimensional image format on the basis of said motion vector corresponding to a disparity in images between left and right eyes and determine whether a currently received image represented by said input image signal is an image for the left eye or an image for the right eye if said input image signal is determined to be a signal of said 3-dimensional image format; and an image interpolation section, wherein:

said motion-vector detection section comprises a first motion-vector detection sub-section and a second motion-vector detection sub-section;

said first motion-vector detection sub-section detects a first motion vector between said first image and said third image;

said image interpolation section carries out an image interpolation process to find a specific image positioned on the time axis at a time between said first image and said third image on the basis of said first motion vector and makes use of said specific image as a subject of vector-detection/format-determination processing; and said second motion-vector detection sub-section detects a second motion vector between said first image and said specific image used as a subject of vector-detection/format-determination processing and makes use of said second motion vector as a motion vector corresponding to said disparity in images between left and right eyes.

6. An image processing method to be adopted by an image processing apparatus having a motion-vector detection section and a format determination section, comprising the steps of:

driving said motion-vector detection section to find a motion vector corresponding to an image disparity existing between left and right eyes to appear as a disparity in images for a case in which an input image signal supplied to said image processing apparatus in accordance with a field sequential system is regarded as a signal of a 3-dimensional image format on a basis of first, second and third images appearing consecutively along a time axis in said input image signal;

first driving said format determination section to determine whether said input image signal is a signal of said 3-dimensional image format or a signal of a 2-dimensional image format; and second driving said format determination section to determine whether a currently received image represented by said input image signal is an image for the left eye or an image for the right eye if said input image signal is determined to be a signal of said 3-dimensional image format, wherein said driving motion-vector detection section includes detecting a first motion vector between said first image and said third image, and detecting a second motion vector between any two images selected from said first to third images as two adjacent images appearing consecutively along the time axis, and wherein first driving said format determination section includes determining whether or not there is a correlation between said first motion vector and said second motion vector and, based on a result thereof, determining whether the format of said input image signal is said 2-dimensional image format or said 3-dimensional image format.

7. An image display apparatus comprising:

a motion-vector detection section configured to find a motion vector corresponding to an image disparity existing between left and right eyes to appear as a disparity in images for a case in which an input image signal supplied to said image display apparatus in accordance with a field sequential system is regarded as a signal of a 3-dimensional image format on a basis of first, second and third images appearing consecutively along a time axis in said input image signal;

a format determination section configured to determine whether said input image signal is a signal of said 3-dimensional image format or a signal of a 2-dimensional image format and determine whether a currently received image represented by said input image signal is an image for the left eye or an image for the right eye if said input image signal is determined to be a signal of said 3-dimensional image format; and a display section configured to display an image based on said input image signal in accordance with an image format recognized by said format determination section in determining whether said input image signal is a signal of said 3-dimensional image format or said 2-dimensional image format, wherein said motion-vector detection section detects a first motion vector between said first image and said third image, and detects a second motion vector between any two images selected from said first to third images as two adjacent images appearing consecutively along the time axis, and wherein said format determination section determines whether or not there is a correlation between said first motion vector and said second motion vector and, based on a result thereof, determines whether the format of said input image signal is said 2-dimensional image format or said 3-dimensional image format.

8. An image processing apparatus comprising:

motion-vector detection means for finding a motion vector corresponding to an image disparity existing between left and right eyes to appear as a disparity in images for a case in which an input image signal supplied to said image processing apparatus in accordance with a field sequential system is regarded as a signal of a 3-dimensional image format on a basis of first, second and third images appearing consecutively along a time axis in said input image signal; and format determination means for determining whether said input image signal is a signal of said 3-dimensional image format or a signal of a 2-dimensional image format and determining whether a currently received image represented by said input image signal is an image for the left eye or an image for the right eye if said input image signal is determined to be a signal of said 3-dimensional image format, wherein said motion-vector detection means detects a first motion vector between said first image and said third image, and detects a second motion vector between any two images selected from said first to third images as two adjacent images appearing consecutively along the time axis, and wherein said format determination means determines whether or not there is a correlation between said first motion vector and said second motion vector and, based on a result thereof, determines whether the format of said input image signal is said 2-dimensional image format or said 3-dimensional image format.

9. An image display apparatus comprising:

motion-vector detection means for finding a motion vector corresponding to an image disparity existing between left and right eyes to appear as a disparity in images for a case in which an input image signal supplied to said image display apparatus in accordance with a field sequential system is regarded as a signal of a 3-dimensional image format on a basis of first, second and third images appearing consecutively along a time axis in said input image signal;

format determination means for determining whether said input image signal is a signal of said 3-dimensional image format or a signal of a 2-dimensional image format and determining whether a currently received image represented by said input image signal is an image for the left eye or an image for the right eye if said input image signal is determined to be a signal of said 3-dimensional image format; and display means for displaying an image based on said input image signal in accordance with an image format recognized by said format determination means in determining whether said input image signal is a signal of said 3-dimensional image format or said 2-dimensional image format, wherein said motion-vector detection means detects a first motion vector between said first image and said third image, and detects a second motion vector between any two images selected from said first to third images as two adjacent images appearing consecutively along the time axis, and wherein said format determination means determines whether or not there is a correlation between said first motion vector and said second motion vector and, based on a result thereof, determines whether the format of said input image signal is said 2-dimensional image format or said 3-dimensional image format.

\* \* \* \* \*